(12) United States Patent
Samadani et al.

(10) Patent No.: US 7,521,620 B2
(45) Date of Patent: Apr. 21, 2009

(54) METHOD OF AND SYSTEM FOR BROWSING OF MUSIC

(75) Inventors: Ramin Samadani, Palo Alto, CA (US); Yu-Yao Chang, Sunnyvale, CA (US); Tong Zhang, Palo Alto, CA (US); Ullas Gargi, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 289 days.

(21) Appl. No.: 11/496,999

(22) Filed: Jul. 31, 2006

(65) Prior Publication Data

US 2008/0022846 A1  Jan. 31, 2008

(51) Int. Cl.
*G10H 1/00* (2006.01)

(52) U.S. Cl. .......................................... 84/600

(58) Field of Classification Search ........... 84/600–602, 84/609, 615; 700/94; 708/172
See application file for complete search history.

(56) References Cited

U.S. PATENT DOCUMENTS

| | | | |
|---|---|---|---|
| 5,668,788 A | 9/1997 | Allison | |
| 6,192,340 B1 * | 2/2001 | Abecassis | 704/270 |
| 6,201,176 B1 | 3/2001 | Yourlo | |
| 6,476,308 B1 | 11/2002 | Zhang | |
| 6,528,715 B1 | 3/2003 | Gargi | |
| 6,587,127 B1 * | 7/2003 | Leeke et al. | 715/765 |
| 6,605,770 B2 * | 8/2003 | Yamane et al. | 84/609 |
| 6,657,117 B2 * | 12/2003 | Weare et al. | 84/668 |
| 6,748,395 B1 | 6/2004 | Picker et al. | |
| 6,933,433 B1 * | 8/2005 | Porteus et al. | 84/615 |
| 6,987,221 B2 | 1/2006 | Platt | |
| 6,993,532 B1 * | 1/2006 | Platt et al. | 707/102 |
| 6,995,309 B2 | 2/2006 | Samadani et al. | |
| 7,312,391 B2 * | 12/2007 | Kaiser et al. | 84/615 |
| 2002/0010759 A1 * | 1/2002 | Hitson et al. | 709/219 |
| 2004/0064209 A1 | 4/2004 | Zhang | |
| 2004/0064476 A1 * | 4/2004 | Rounds | 707/104.1 |
| 2005/0160111 A1 * | 7/2005 | Plastina et al. | 707/102 |
| 2006/0041577 A1 * | 2/2006 | Ellicott et al. | 707/102 |

(Continued)

FOREIGN PATENT DOCUMENTS

EP   0955592 A   11/1999

(Continued)

OTHER PUBLICATIONS

R. Samadani, et al., "A hybrid signal-feature system for music discovery (or finding needles in haystacks)," Proceedings of the SPIE, vol. 5022, pp. 401-406 (2003).

(Continued)

*Primary Examiner*—David S. Warren (57) ABSTRACT

The present invention provides a method of and system for browsing of music. In an embodiment, a method of browsing recorded music comprises steps of: selecting a song from a library; playing at least a portion of the selected song for a user; while the portion of the selected song is playing, accepting input from the user, the input comprising an indication of the user's enjoyment of the at least a portion of the selected song; repeating said steps of selecting, playing and accepting to generate a sequence of song portions; and creating a record comprising an identification of each selected song portions and the indication for the song portions.

21 Claims, 3 Drawing Sheets

102

| Song ID | Sample | Metadata | Feature Vector |
|---|---|---|---|
| $Song_1$ | start at: 20 sec<br>duration: 8 sec | $title_1$, $artist_1$ | $f_{11}$, $f_{12}$ ... $f_{1k}$ |
| $Song_2$ | start at: 10 sec<br>duration: 8 sec | $title_2$, $artist_2$ | $f_{21}$, $f_{22}$ ... $f_{2k}$ |
| $Song_2$ | start at: 30 sec<br>duration: 8 sec | $title_2$, $artist_2$ | $f_{31}$, $f_{32}$ ... $f_{3k}$ |
| $Song_3$ | start at: 12 sec<br>duration: 8 sec | $title_3$, $artist_3$ | $f_{41}$, $f_{42}$ ... $f_{4k}$ |
| $Song_4$ | start at: 78 sec<br>duration: 8 sec | $title_4$, $artist_4$ | $f_{51}$, $f_{52}$ ... $f_{5k}$ |
| . | . | . | . |
| . | . | . | . |
| . | . | . | . |

U.S. PATENT DOCUMENTS

| | | | |
|---|---|---|---|
| 2006/0107823 A1 | 5/2006 | Platt et al. | |
| 2006/0112082 A1* | 5/2006 | Platt et al. | 707/3 |
| 2006/0112098 A1* | 5/2006 | Renshaw et al. | 707/7 |
| 2006/0168340 A1* | 7/2006 | Heller et al. | 709/242 |
| 2006/0195512 A1* | 8/2006 | Rogers et al. | 709/203 |
| 2006/0206478 A1* | 9/2006 | Glaser et al. | 707/5 |
| 2006/0212442 A1* | 9/2006 | Conrad et al. | 707/5 |
| 2006/0212444 A1* | 9/2006 | Handman et al. | 707/5 |
| 2006/0294091 A1* | 12/2006 | Hsieh et al. | 707/5 |
| 2006/0294131 A1* | 12/2006 | Hsieh et al. | 707/102 |
| 2007/0025194 A1* | 2/2007 | Morse et al. | 369/30.1 |
| 2007/0038672 A1* | 2/2007 | Plastina et al. | 707/104.1 |
| 2007/0168388 A1* | 7/2007 | Plastina et al. | 707/104.1 |
| 2007/0174147 A1* | 7/2007 | Klein, Jr. | 705/28 |
| 2007/0183742 A1* | 8/2007 | Cowgill | 386/69 |
| 2007/0208771 A1* | 9/2007 | Platt | 707/102 |
| 2007/0276733 A1* | 11/2007 | Geshwind et al. | 705/104 |
| 2007/0282905 A1* | 12/2007 | Karlberg | 707/104.1 |
| 2008/0021851 A1* | 1/2008 | Alcalde et al. | 706/21 |
| 2008/0022844 A1* | 1/2008 | Poliner et al. | 84/609 |
| 2008/0080837 A1* | 4/2008 | Mei et al. | 386/95 |
| 2008/0133371 A1* | 6/2008 | Chumbley et al. | 705/14 |

FOREIGN PATENT DOCUMENTS

| | | |
|---|---|---|
| EP | 1608170 A | 12/2005 |
| EP | 1681872 A | 7/2006 |

OTHER PUBLICATIONS

PCT Search Report and Written Opinion of PCT/US2007/017089.

* cited by examiner

| Song ID | Sample | Metadata | Feature Vector |
|---|---|---|---|
| $Song_1$ | start at: 20 sec<br>duration: 8 sec | $title_1$, $artist_1$ | $f_{11}, f_{12} \ldots f_{1k}$ |
| $Song_2$ | start at: 10 sec<br>duration: 8 sec | $title_2$, $artist_2$ | $f_{21}, f_{22} \ldots f_{2k}$ |
| $Song_2$ | start at: 30 sec<br>duration: 8 sec | $title_2$, $artist_2$ | $f_{31}, f_{32} \ldots f_{3k}$ |
| $Song_3$ | start at: 12 sec<br>duration: 8 sec | $title_3$, $artist_3$ | $f_{41}, f_{42} \ldots f_{4k}$ |
| $Song_4$ | start at: 78 sec<br>duration: 8 sec | $title_4$, $artist_4$ | $f_{51}, f_{52} \ldots f_{5k}$ |
| ⋮ | ⋮ | ⋮ | ⋮ |

| Song ID | Score | Time Played | Date, Time |
|---|---|---|---|
| $Song_1$ | 5 | 70% | July 7, 10:01:00 |
| $Song_2$ | 3 | 50% | July 7, 10:01:04 |
| $Song_3$ | ∅ | 45% | July 7, 10:01:03 |
| $Song_4$ | 4 | 15% | July 20, 18:32:47 |
| $Song_5$ | ∅ | 65% | July 20, 18:32:49 |
| . | . | . | . |
| . | . | . | . |
| . | . | . | . |

METHOD OF AND SYSTEM FOR BROWSING OF MUSIC

FIELD OF THE INVENTION

The present invention relates to the field of browsing music.

BACKGROUND OF THE INVENTION

The cost of digital storage for music is decreasing while Internet music services are becoming more prevalent. Accordingly, people are increasingly enjoying music obtained from Internet music services and stored on high-capacity portable players. And, as more people are acquiring music collections, the music collections are becoming larger, ranging from hundreds of songs to tens of thousands of songs. In addition, digital music production tools have made music creation easier and less-expensive. As a result, many new and lesser known artists are dramatically expanding the universe of recorded music that is available to choose from.

These trends make the ability to efficiently browse music collections and particularly, large collections, increasingly important. For example, a person may wish to browse their own music collection or may wish to discover songs they like from an unknown music collection. Or a music service provider may wish to provide improved tools that allow its customers to browse the service provider's collection of music.

Known methods of browsing music include websites that offer music for sale and which allow a person to play samples of songs. However, this can be somewhat tedious in that the person is typically required to manually select the desired artist, album and song from a large collection offered for sale. Collaborative filtering is a method of inferring what a particular person may like from a partial list of that person's likes and the tastes of many people. Collaborative filtering does not work well for new and lesser known artists due to lack of required information from many people.

SUMMARY OF THE INVENTION

The present invention provides a method of and system for browsing of music. In an embodiment, a method of browsing recorded music comprises steps of: selecting a song from a library; playing at least a portion of the selected song for a user; while the portion of the selected song is playing, accepting input from the user, the input comprising an indication of the user's enjoyment of the at least a portion of the selected song; repeating said steps of selecting, playing and accepting to generate a sequence of song portions; and creating a record comprising an identification of each selected song portion and the indication for the song portion.

BRIEF DESCRIPTION OF THE DRAWINGS

The present invention is described with respect to particular exemplary embodiments thereof and reference is accordingly made to the drawings in which.

DETAILED DESCRIPTION OF THE INVENTION

Figure 1:
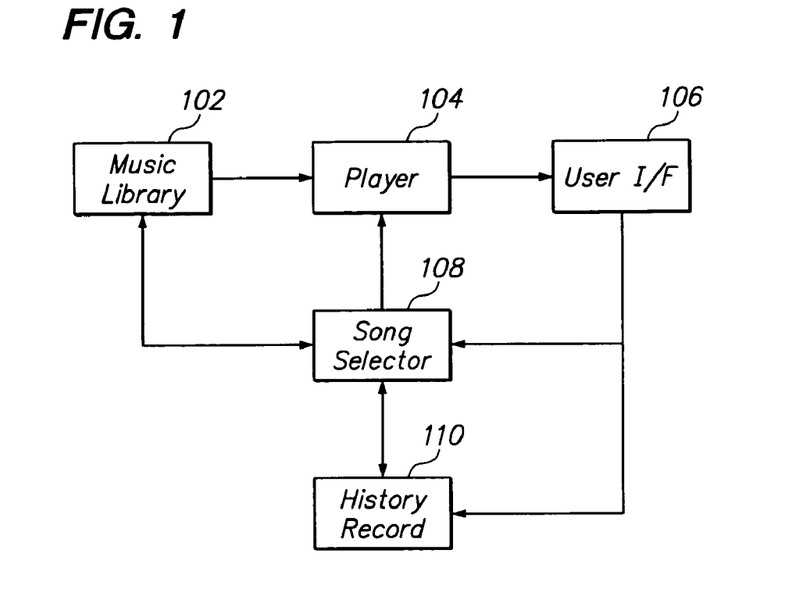
FIG. 1 illustrates a block diagram of a system for browsing music in accordance with an embodiment of the present invention.

FIG. 1 illustrates a block diagram of a system 100 for browsing music in accordance with an embodiment of the present invention. The system 100 includes a music library 102, a player 104, a user interface 106, a next song selector 108 and a history record 110.

The music library 102 stores at least a portion of each song of a collection of songs to be browsed by the system 100, along with information about each song. While the entirety of each song may be included in the library 102, this is not necessary. The portion of each song is a representative excerpted sample of the song. The songs or portions thereof may be stored as audio files, such as in MP3 format. The sample for a song may be selected manually from the song, such as by a user listening to the song and selecting a portion of the song that the user decides is representative of the song. Alternatively, the samples may be selected automatically (i.e. by a computer implemented method). For example, U.S. Patent Publication No. 2004/0064209, the entire contents of which are hereby incorporated by reference, describes a system and method for generating an audio thumbnail of an audio track, which may be used to obtain the samples stored in the library 102. In accordance with U.S. Patent Publication No. 2004/0064209, a first content feature, such as singing, is detected as a characteristic of an audio track. A predetermined length of the detected portion of the audio track corresponding to the first content feature is extracted from the audio track. A highlight of the audio track, such as a portion of the audio track having a sudden increase in temporal energy within the audio track, is detected; and a portion of the audio track corresponding to the highlight is extracted from the audio track. The two extracted portions of the audio track are combined as a thumbnail of the audio track.

The stored information about each song includes at least an identification of the song, but may include additional information. For example, the library 102 may contain metadata about the song which may include such factual information as the name of the artist, the title of the song, genre, mood, rhythm description, style, date recorded, album title, etc. An specific example of song metadata are ID3 information tags which include artist name and song title, and possibly other information, such as date, track number of CD, album title, etc.

The additional information stored in the library 102 about each song may include audio feature information extracted or processed from the audio track itself. For example, U.S. Pat. No. 6,995,309, the entire contents of which are hereby incorporated by reference, describes a system and method for music identification in which a feature vector is computed for each song in a database. Such a feature vector may be extracted and stored in the library 102 for each song to be browsed or for each portion of a song in the library 102. In accordance with U.S. Pat. No. 6,995,309, the feature vector for a song is determined by generating a spectrogram of a processed time signal for the song and then extracting features from the spectrogram. For purposes of the present invention, the processed time signal for the song is a digitally sampled portion of the song, such as an audio thumbnail, or the entire song. Various techniques related to discrete-time signal processing are well known in the art for generating the spectrogram. The features are represented by numeric values, and loosely represent specific perceptual musical characteristics, such as, for example, pitch, tempo and purity. In an embodiment, the feature vector for each song includes five feature components derived from the projection of a spectrogram in the time (X) and frequency (Y) axes. The first feature is the Michelson contrast in the X direction, which represents the level of "beat" contained in a song sample. The second feature represents the amount of "noise" in the Y direction, or the "purity" of the spectrum. The third feature is the entropy in the Y direction, which is calculated by first normalizing the Y projection of the spectrogram to be a probability distribution and then computing the Shannon entropy. The fourth and fifth features are the center of mass and the moment of inertia, respectively, of the highest three spectral peaks in the Y projected spectrogram. The fourth and fifth features roughly represent the tonal properties of a song sample. Features representing other musical characteristics may also be used in the feature vectors. The feature vectors may be extracted from the entire song or from a portion of the song.

Figure 2:
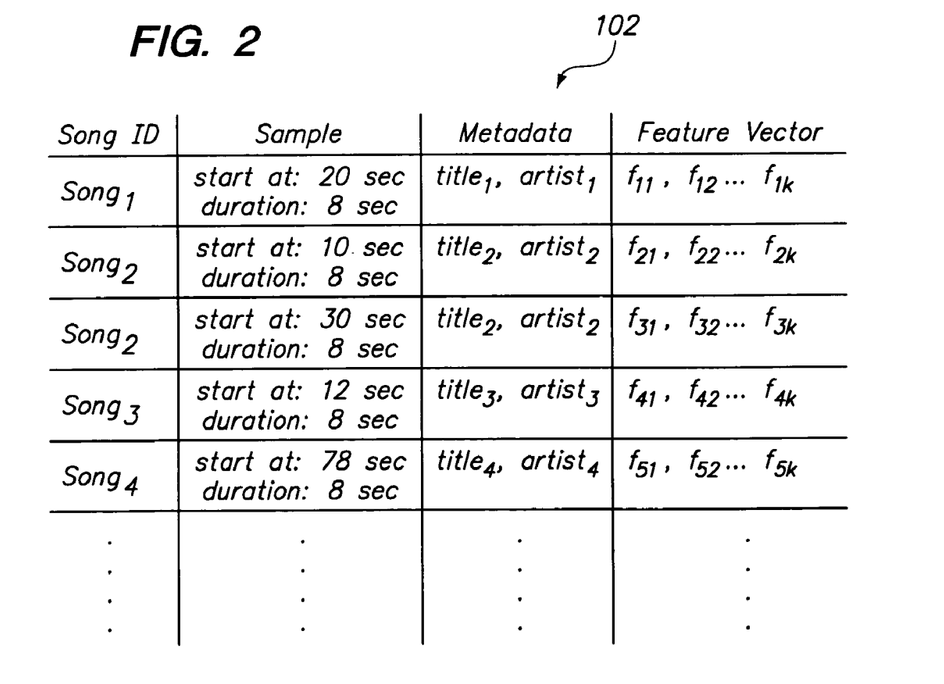
FIG. 2 illustrates information stored in a song library in accordance with an embodiment of the present invention.

FIG. 2 illustrates information stored in the library 102 in accordance with an embodiment of the present invention. As shown in FIG. 2, the stored information may be represented by a table with each song portion represented by a row in the table. A first column includes the identification of the song. The second column may include a pointer to the excerpted sample of the song. For example, where the entire song is stored in the library 102, the pointer may indicate the start of the sample relative to the start of the audio track of the song (e.g., starting twenty seconds into the song) and a duration of the sample. In FIG. 2, the samples have a uniform duration of eight seconds, though the durations can be different and need not be uniform. In an embodiment, two or more different excerpted samples of the same song may be present in the library 102. This is shown in FIG. 2 by Song$_2$ appearing twice in the first column. However, two different pointers for Song$_2$ appear in the second column, each indicating a different position within the song. Particularly, the first sample starts at ten seconds into the song and is eight seconds long. The second sample is also eight seconds long, but starts at thirty seconds into the song. In this embodiment, the song identification and the pointer of each row together uniquely identify each excerpted portion. Alternatively, the table may include the sample itself or pointer to the entire song. A third column in the table may include the metadata for the song. As shown in FIG. 2, the metadata may include the song's title and artist. A fourth column may include the extracted audio parameters. As shown in FIG. 2, this includes the feature vector for each song. As is also shown in FIG. 2, the feature vector $\underline{f}$ for a song may be given as: $\underline{f}=f_1, f_2, \ldots, f_k$, where the feature vector has k components or features.

Referring again to FIG. 1, the player 104 is functionally coupled to the library 102 so that the stored portions of the songs can be selectively played by the player 104. The player 104 is compatible with the format in which the song portions are stored. For example, the player 104 may be an MP3 player.

User interface 106 provides a user with the ability to interact with the system 100 while browsing music. For listening to audio files played by the player 104, the user interface 106 may include one or more sound output devices, such as one or more speakers, an earphone or headphones. The user interface 106 also includes an input device such as a keyboard or hand-held remote controller for providing user input to the system 100. A microphone may be used as an input device and may be used in conjunction with speech recognition software to accept verbal input from the user.

A song selector 108 receives input from the user via the interface 106 and also has access to the library 102. Based on the user input and the information in the library 102, the song selector 108 selects the song (or portion thereof) which is to be played next via the player 102. The song selector 108 may also terminate the playing of a song (or portion thereof) based on input (e.g. from the user) to the selector 108. The song selector 108 performs a song selection algorithm, as explained in more detail herein.

A history record 110 may be generated by the system 100. For example, the history record 110 may include a sequence of songs selected by the song selector 108 while the user interacts with the system 100 to browse music. Such a sequence of songs may be used as a playlist to control the player 104 or a different player such as a conventional audio player, to play the entireties of songs after the user has browsed a music collection. The playlist may be generated from the record 110 by filtering would only include those songs for which the user gave a positive indication that the song was liked by the user. In addition, or alternatively, the history record 110 may include information obtained from the user interface 106, such as indications for selected songs as to whether the user liked or disliked a song. This information may be saved for later use by the song selector 108 or as input to another song selector or song selection algorithm, such as a collaborative filter.

The system 100 may be implemented by machine, such as by an appropriately configured and programmed general-purpose computer system. The library 102 and history record 110 may each be stored in memory and/or mass storage of the computer. The player 104 and song selector 108 may each be implemented by an appropriate software program installed on the computer. The user interface 106 may be implemented by a display, keyboard and speakers of the computer system. The interface 106 may include a hand-held remote controller so that user can provide input from a comfortable distance or position. The system 100 may include hi-fidelity audio equipment, such as a powered audio amplifier and loud speakers to improve the listening experience for the user.

Figure 3:
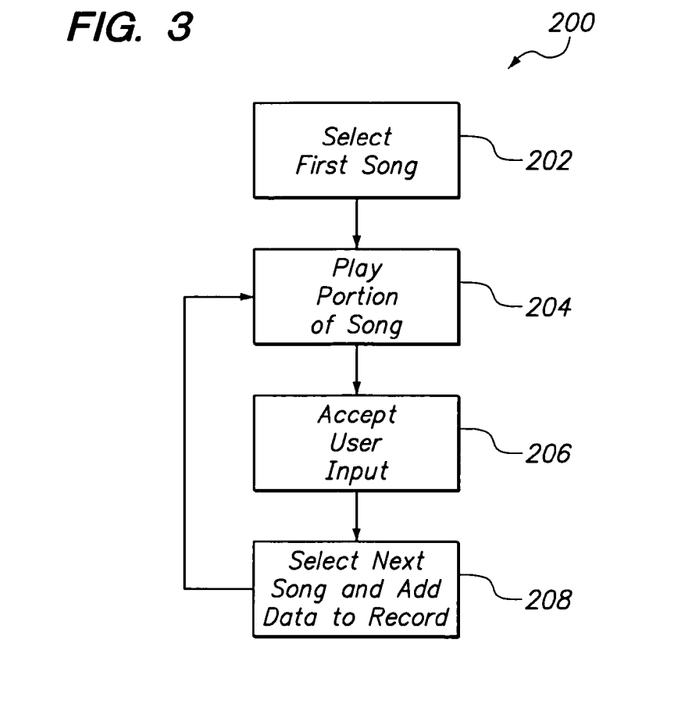
FIG. 3 illustrates a method of browsing music in accordance with an embodiment of the present invention.

FIG. 3 illustrates a method 200 of browsing music in accordance with an embodiment of the present invention. The method 200 of FIG. 3 may be implemented by the system 100 of FIG. 1. In a step 202, a first song is selected from among those available for browsing in the library 102. The song selector 108 may perform this step. Because there is not yet any user preference information available for selecting the first song, the first song may be selected randomly. Alternatively, the first song may be selected according to some other criteria, such as by selecting a song having a representative or average feature vector among the songs in the library 102.

In a step 204, at least a portion of the song is played. In this step, the entire song or least the excerpted portion of the song begins playing so that the user can hear it. This step may be performed by retrieving the portion of the song from the library 102 and playing the song by the player 104.

While the at least a portion of the selected song is playing, input from the user is accepted in step 206. The input comprises an indication of the user's enjoyment of the song. For example, the indication may be a positive indication that the user likes the song or a negative indication that the user dislikes or is indifferent to the song. In this case, the user may press one key on the computer keyboard or the hand-held remote to input the positive indication and a different key to input the negative indication. Alternatively, the indication may be a numerical score that is indicative of whether and how much the user likes the song. For example, keys on the keyboard or hand-held remote may be assigned values of one through five, where one means that the user likes the song extremely well, a five means the user dislikes or indifferent to the song, and values between zero and five are assigned varying degrees of enjoyment between these two extremes.

Only a portion of the song might be played in the step 206. For example, the portion may be of a predetermined duration (e.g., eight seconds). If the user provides the input before the expiration of the time period, then the playing of the portion may be terminated before the entire portion is played. For example, the playing may be immediately terminated. If the user does not provide any input while the portion is being played, this may be interpreted and treated as an indication regarding the user's enjoyment of the song. For example, this may be interpreted as a negative indication that the user dislikes the song. Alternatively, if the user does not provide any input while the portion is being played, this may be ignored, as though the song had not been played.

In a step 208, a next song is selected to be played by the song selector 108. The at least a portion of the next song begins playing after user input regarding the previous song was received or the portion of previous song was allowed to complete without input from the user. The next song may begin playing immediately after the user input is received or the previous song terminated so that songs are presented to the user in quick succession, as fast the user is able to make decisions and provide input. This allows a large collection of songs to be browsed quickly and efficiently.

The next song is selected based on the indication for at least the previously selected song and information stored in the library 102. For example, the next song may be selected based on the indication for the previously selected song and upon a comparison of the extracted audio parameters for the previously selected song to the extracted audio parameters for songs in the library. More particularly, the feature vectors for all of the songs in the library 102 may be mapped to points in a multi-dimensional space. For example, if there are n parameters in the feature vectors, then each may be mapped to a point in n-dimensional space. In addition, Euclidean distances between the point for each song (preferably excluding those already selected) and the point for the previous song may be computed. The distance d between a feature vector $f_1$ for $song_1$ and a feature vector $f_2$ for a $song_2$ may be given as: $d=|f_1-f_2|$. Alternatively, rather than computing Euclidean distances, another distance measure may be used, such as Mahalanobis distance which is based on correlations between variables and is scale-invariant.

If the previous song was liked by the user, then the next song to be selected may be one with a small distance to the previous song. This is likely to result in the next selected song having similar audio characteristics to the previous song. As such, the next song has a good probability of being liked by the user. The selected song may the one with the smallest distance to the previous song or it may be selected from among several songs that have relatively small distances. For example, the selected song may be chosen randomly from among a group of songs that have less than a predetermined distance or that are within a certain percentile of distance (e.g., the closest ten percent).

Alternatively, if the previous song was disliked by the user, then the next song to be selected may be one having a great distance from the previous song. This is likely to result in the next selected song having dissimilar audio characteristics to the previous song. This selection is based on the assumption that a song that is dissimilar to one that is disliked by the user has a good probability of being liked by the user. The selected song may be the one with the greatest distance to the previous song or it may be selected randomly from among several songs that have relatively great distances. For example, the selected song may be chosen from among a group of songs that have greater than a predetermined distance or that are within a certain percentile of distance (e.g., the farthest ten percent).

In this manner, each next song is selected such it has a good probability of being liked by the user. This reduces the amount of songs that the user dislikes that are presented to the user for which the user would then have to listen to and give feedback. This also allows a large collection of songs to be browsed and those songs that user likes to be quickly and efficiently identified.

Different song selection algorithms may be employed which use the indication for at least the previously selected song and information stored in the library 102 to select songs that have a good probability of being liked by the user. For example, rather than only taking into account the user's response to the previous song, the next song may be selected based on the user's response to a plurality of songs. More particularly, all or some of the previously selected songs for which the user gave a positive indication may be grouped. For each song in the library 102 (preferably excluding those already selected), its distance to the group may be calculated by determining its distance to the closest song in the group or by determining its distance to an average of the feature vectors of songs in the group. The next song may then be selected from those in the library that have small distance to the group (e.g., the smallest distance or within a certain percentile of distance).

In an alternative embodiment, both negative and positive responses may be taken into account. More particularly, all or some of the previously-selected songs for which the user gave a positive indication may be placed into a first group, while some or all of the previously-selected songs for which the user gave a negative indication may be placed into a second group. Then, for each song in the library 102 (preferably excluding those already selected), its distances to both groups may be determined. The next song may be selected such that its distance to the first group is minimized and its distance to the second group is maximized. For example, where a song's distance to the first group is given as $d_{yes}$ and the song's distance to the second group is given as $d_{no}$, a combined distance measure may be given as: $d_{yes/no}=(d_{yes}+\epsilon)/(d_{no}+\epsilon)$, where $\epsilon$ is a constant. Then, the next song may be selected as one that has the largest value of $d_{yes/no}$ or whose value for $d_{yes/no}$ is within a certain percentile of the largest.

As mentioned, the user input may include a numerical score. Accordingly, the next song may be selected by taking into account the scores for some or all of the previously selected songs. For example, some or all of the previously selected songs for which a score was received may be placed into a group. Then, the distance to the group for each song in the library 102 (preferably excluding those that were already selected) may be calculated. For example, the distance between a song k in the library 102 to a group consisting of previously selected songs i=1, 2, . . . , n may be computed as:

$$d_k = \min_{(i=1, 2, \ldots, n)} w_i \|f_i - f_k\|$$

where $w_i$ is the numerical score for the song i and where a low score indicates that the song was liked and a high score indicates that the song was disliked. Accordingly, the distances between each song in the library and each previously selected song are weighted according to the score received by the previously selected song. The distance for a song in the library to the group is then computed as the shortest weighted distance to any member of the group. Moreover, the distance upon which the next song selection is based can change over time based on user input. For example, if there is no user input or negative user input for one or more selected songs, then the percentile distance may gradually increase, resulting in a broader exploration of the music library. As user inputs are detected or positive inputs are received, then the percentile distance may gradually decrease, resulting in a narrowing of the exploration of the library.

Also, metadata stored in the library 102 may be used by the song selector 108 for selecting the next song. In this case, the metadata may be used to increase the similarity of the next song to the previous song or set of previously selected songs. For example, if the user input for previous songs indicates that the user is more likely to enjoy a song if it is in a particular genre, then the song selection algorithm may exclude songs from certain other genres, even if their feature vectors indicate that they have good probability of being enjoyed. Alternatively, the metadata may be used to widen the variety of selected songs. For example, if a selected song is by a particular artist, then that artist's songs may be excluded from consideration for the next song or next several songs, even if their feature vectors indicate that they have good probability of being liked based on the user's prior responses.

In an embodiment, the user can, at any time, opt to have a next song selected randomly from the collection of songs to be browsed. For example, an additional key on the keyboard or hand-held remote may be assigned a "pick random song" function. Therefore, rather than continuing to browse songs selected by the song selector 108 based on the user's input regarding the previous song or songs, the next song may be selected randomly. This has the effect of returning to step 202 in the method of FIG. 3. Then, once the user provides an indication regarding the user's enjoyment of this randomly selected song, subsequent songs may be selected by the song selector 108, as explained above. The subsequent song selections may take into account only input received from the user after the "pick random song" selection was invoked. Alternatively, input received from the user regarding songs played before the "pick random song" selection was invoked may be taken into account.

Additional user input controls may be provided. For example, the duration of the portion of the songs played during browsing may be adjustable according to the user's preference. For example, the user may choose the durations of the song portions to be played and may also choose between playing portions of a determined duration or playing the entireties of the songs. Also, the user may be able to replay a particular song or portion thereof or to play a longer duration of a particular song if, for example, the user is unsure of whether the song is liked or disliked. The user may also control of the volume at which the songs are played.

In an embodiment, one or more filter criterion may be applied to songs in the library so as to limit the range of songs that may possibly selected by the song selector 108. For example, the user may desire to create a playlist of slow tempo songs suitable to be play while falling asleep. Such a playlist may be designated "songs for bedtime." As another example, the user may desire to create a playlist of faster tempo songs suitable for dancing. This may be accomplished by the user specifying filter criterion before beginning to browse the songs. For example, if the user desires to create a "songs for dancing" playlist, the user may specify that only "songs with tempo in the range of 60 to 120 and of ¾ meter" be made available as possible selections by the song selector 108.

In another embodiment, the song selector 108 may select songs based on extrapolating trends in the user's indications for previously selected songs. This is based on the assumption that the user's taste may shift while the user is browsing songs. For example, if the user indicates enjoyment of songs with slow tempo, and later indicates enjoyment of songs with medium tempo, the song selector 108 may select a next song having fast tempo as a way of assisting the user in further exploration of the library 102.

In an embodiment, components of the feature vector for songs in the library may be weighted differently from each other for performing the distance calculations. This weighting may be under control of the user. For example, the if the user is interested in creating a playlist of songs having a significant "beat," the system may weigh the Michelson contrast in the X direction, which represents the level of "beat" contained in a song sample, more heavily than other components. Then, when distance is calculated between song portions, those that have a greater "beat" will appear closer.

As described above, the history record 110 may include a sequence of songs selected by the song selector 108 that may be saved and used later to generate a playlist to control the player 104 or a different player to play the entireties of songs. In an embodiment, the user may optionally change the order in which the songs are played according to the user's preferences or the songs may be played from the playlist in random order. In addition, the song selector 108 may be employed to interject new songs into the playlist that are determined to have a good probability of being liked by the user based on the songs already in the playlist. For example, the feature vectors for interjected songs may have a small distance to those of one or more of the songs already in the playlist. The proportion of interjected songs may be controlled by the user, such as through an additional key or knob on the keyboard or remote.

Figure 4A:
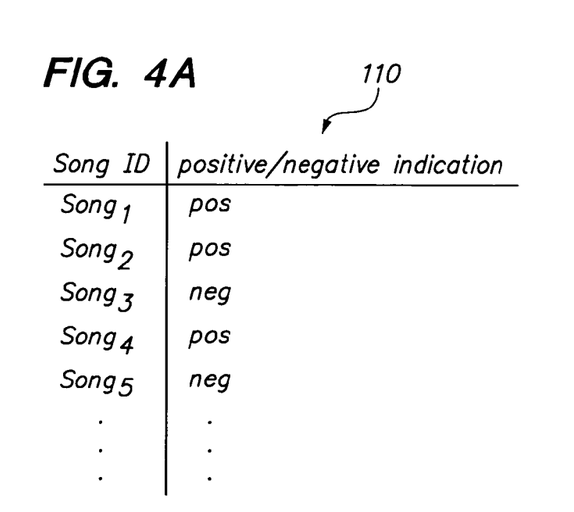
FIGS. 4A-C illustrate records of music browsing information generated in accordance with embodiments of the present invention.
Figure 4B:
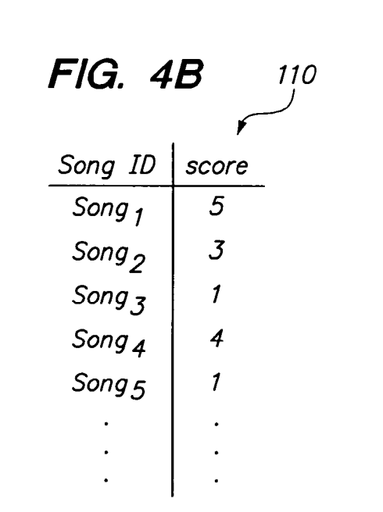
Figure 4C:
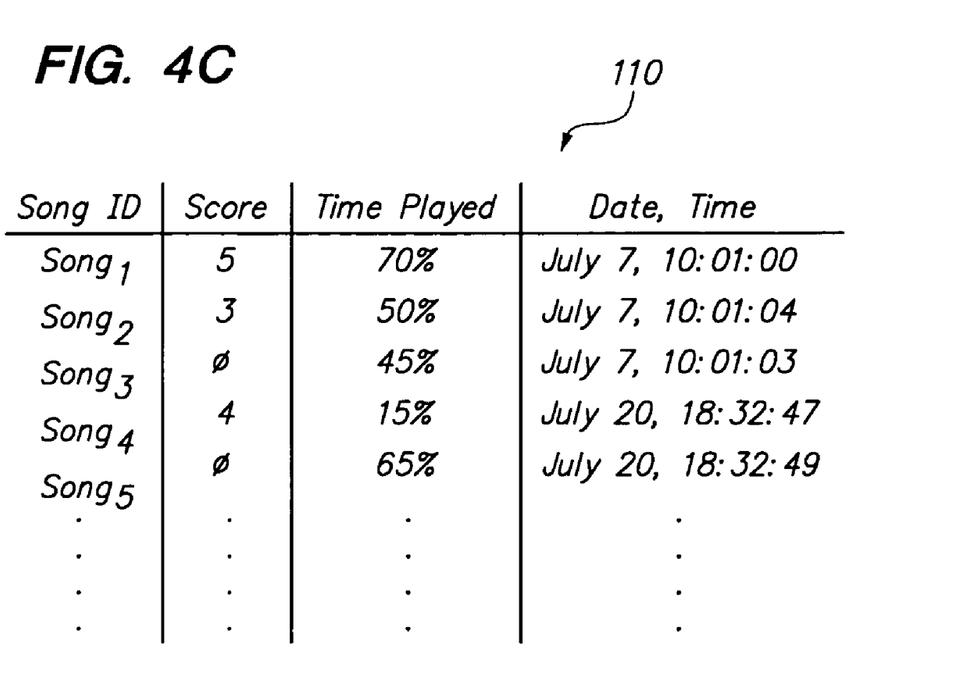

FIGS. 4A-C illustrate records 110 of music browsing information generated in accordance with embodiments of the present invention. Particularly, FIGS. 4A-C each illustrate a table in which each selected song (for which at least a portion is played for the user) occupies a row in the table and a first column includes the identification of the selected songs. The record of FIG. 4A has a second column which includes a positive or negative indication for each song in the table. As explained above, the positive indication means the user liked the song and the negative indication means that the user disliked the song. The record of FIG. 4B has a second column which includes a score for each song in the table that indicates how much the user liked or disliked the song. As in the examples above, the scores range from one to five, where a lower score indicates greater enjoyment of the song.

Similarly to FIG. 4B, the record of FIG. 4C has a second column which includes a score for each song in the table that indicates how much the user liked or disliked the song. In addition, the record of FIG. 4C has a third column which indicates how much of the sample of the song was played before the user input the score for the song. In this example, the third column includes the percent of the total duration of the sample. Thus, if the sample was eight seconds long and the user input a score four seconds into the sample, the time played would be 50%. If the entire sample was allowed to be played without any user input, then the time played would be 100%. It will be apparent that the amount of the sample that was played could be represented in other ways (e.g. in seconds). A fourth column in the record of FIG. 4C includes date and time information corresponding to each song represented in the table. In this example, the date and time marks the time of the user input. If each song begins playing immediately upon receiving the user input for the previous song, then the date and time information in the table for a previous song indicates when the next song began playing. Thus, referring to FIG. 4C, the user input for song$_2$ was received at 10:01 am (represented as 10:01:00). This is also the time that song$_3$ began playing. Then, at four second after 10:01 am (represented as 10:01:04) the user input for song$_3$ was received. This is also the time that song$_4$ began playing.

The records 110 may be used by the song selector 108 or saved for later use as input to another song selector or song selection algorithm, such as a collaborative filter.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A method of browsing recorded music comprising steps of:
   selecting a song from a library;
   playing at least a portion of the selected song for a user;
   while the portion of the selected song is playing, accepting input from the user, the input comprising an indication of the user's enjoyment of the at least portion of the selected song;
   repeating said steps of selecting, playing and accepting to generate a sequence of song portions; and
   creating a record comprising an identification of each selected song portion, the indication for the song portion, and the amount of time while the portion of each selected song was playing before the indication for the song was received.

2. The method according to claim 1, furthereomprising generating a playlist from the record, the playlist comprising identifications of the song portions in the record that were enjoyed by the user, and playing the entireties of songs in the playlist.

3. The method according to claim 2, further comprising interjecting new songs into the playlist while playing the entireties of the sohgs in the playlist, wherein said songs are selected to be interjected based on the indications received for the songs in the playlist.

4. The method according to claim 1, further comprising ceasing said playing the at least a portion of the selected song immediately upon the user making the indication.

5. The method according to claim 1, wherein each song of the sequence after a first song of the sequence is selected based on the indication for at least the previously selected song.

6. The method according to claim 1, wherein each song of the sequence after a first song of the sequence is selected based on the indication for a plurality of previously selected songs.

7. The method according to claim 6, wherein the indication for each song of the plurality of previously selected songs is weighted accordingly to position in the sequence.

8. The method according to claim 1, wherein the library includes extracted audio parameters and metadata for each song.

9. The method according to claim 1, wherein the library includes two or more different selected portions of the same song.

10. A method of browsing recorded music comprising steps of:
    selecting a song from a library;
    playing at least a portion of the selected song for a user wherein the at least a portion of each selected song is limited to a determined duration and the determined duration is adjustable by the user;
    while the portion of the selected song is playing, accepting input from the user, the input comprising an indication of the user's eniovment of the at least a portion of the selected song;
    repeating said steps of selecting, playing and accepting to generate a sequence of song portions: and
    creating a record comprising an identification of each selected song portion and the indication for the song portion.

11. The method according to claim 5, wherein the library includes extracted audio parameters for each song and wherein each song of the sequence after a first song of the sequence is selected based on a comparison of the extracted audio parameters for the selected song to the extracted audio parameters for the previously selected song and the indication for at least the previously selected song.

12. The method according to claim 11, wherein the comparison is performed by computing a distance between a vector of the extracted audio parameters for the selected song and a vector of the extracted audio parameters for at least the previously selected song.

13. The method according to claim 11, wherein the selected song is selected to minimize the distance between the selected song and one or more previously selected songs for which the indication is positive and to maximize the distance between the selected song and one or more previously selected songs for which the indication is negative.

14. The method according to claim 11, wherein the selected song is selected according to whether it is within a determined percentile of distance to one or more previously selected songs.

15. The method according to claim 11, wherein each of a plurality of the selected songs is selected according to whether it is within a determined percentile of distance to one or more previously selected songs and wherein the determined percentile of distance varies over time.

16. The method according to claim 11, wherein the library includes metadata for each song and wherein each song of the sequence after a first song of the sequence is selected based on the metadata for the song.

17. The method according to claim 5, wherein two alternatives are computed for the selected song before the indication is received from the user and then the at least a portion of the appropriate one of the two alternatives is played immediately after the indication is received.

18. Machine executable code stored on a machine readable storage device for performing a method of browsing recorded music, comprising steps of:
    selecting a song from a library;
    playing at least a portion of the selected song for a user;
    while the portion of the selected song is playing, accepting input from the user, the input comprising an indication of the user's enjoyment of the at least a portion of the selected song and the amount of time the portion of the selected one of the songs was playing before the indication for the song was received;
    repeating said steps of selecting, playing and accepting for a sequence of song portions; and
    creating a record comprising an identification of each selected song portion and an indication of the user's eniovment of the at least a portion of the selected song and the amount of time the portion of the selected one of the songs was playing before the indication for the song was received for the song portion.

19. A system for browsing music comprising:
    a library comprising a plurality of entries for songs to be browsed, each entry comprising identification of at least a playable portion of the song corresponding to the entry and information about the song;

a player for selectively playing the portions of the songs;

a user interface for accepting input from the user while a portion of a selected one of the songs is playing, the input comprising an indication of the user's enjoyment of the selected song and the amount of time the portion of the selected one of the songs was playing before the indication for the song was received; and a song selector that selects a next playable portion of a song from the library to be played next by the player based on the input accepted from the user and based upon the information about the songs in the library.

20. Machine executable code stored on a machine readable storage device for performing a method of browsing recorded music, comprising steps of:

selecting a song from a library;

playing at least a portion of the selected song for a user wherein the at least a portion of the selected song is limited to a determined duration and the determined duration is adjustable by the user;

while the at least a portion of the selected song is playing, accepting input from the user, the input comprising an indication of the user's enjoyment of the at least a portion of the selected song;

repeating said steps of selecting, playing and accepting for a sequence of song portions; and creating a record comprising an identification of each selected song portion and the indication of the user's enjoyment for the song portion.

21. A system for browsing music comprising:

a library comprising a plurality of entries for songs to be browsed, each entry comprising identification of at least a playable portion of the song corresponding to the entry and information about the song;

a player for selectively playing the portions of the songs wherein each portion of each selected song is limited to a determined duration and the determined duration is adjustable by the user;

a user interface for accepting input from the user while a portion of a selected one of the songs is playing, the input comprising an indication of the user's enjoyment of the selected song; and a song selector that selects a next playable portion of a song from the library to be played next by the player based on the indication accepted from the user and based upon the information about the songs in the library.

* * * * *

UNITED STATES PATENT AND TRADEMARK OFFICE
CERTIFICATE OF CORRECTION

PATENT NO. : 7,521,620 B2
APPLICATION NO. : 11/496999
DATED : April 21, 2009
INVENTOR(S) : Ramin Samadani et al.

It is certified that error appears in the above-identified patent and that said Letters Patent is hereby corrected as shown below:

In column 9, line 21, in Claim 1, after "at least" insert -- a --.

In column 9, line 30, in Claim 2, delete "furthereomprising" and insert -- further comprising --, therefor.

In column 9, line 37, in Claim 3, delete "sohgs" and insert -- songs --, therefor.

In column 10, line 3, in Claim 10, delete "eniovment" and insert -- enjoyment --, therefor.

In column 10, line 61, in Claim 18, delete "eniovment" and insert -- enjoyment --, therefor.

Signed and Sealed this

Fifteenth Day of December, 2009

David J. Kappos
*Director of the United States Patent and Trademark Office*